United States Patent [19]

Wargo et al.

[11] Patent Number: 4,466,015
[45] Date of Patent: Aug. 14, 1984

[54] AUTOMATIC COLOR BURST MAGNITUDE CONTROL FOR A DIGITAL TELEVISION RECEIVER

[75] Inventors: Robert A. Wargo, Ringoes; Stuart S. Perlman, Princeton, both of N.J.

[73] Assignee: RCA Corporation, New York, N.Y.

[21] Appl. No.: 428,591

[22] Filed: Sep. 30, 1982

[51] Int. Cl.³ .......................................... H04N 9/535
[52] U.S. Cl. ................................................... 358/27
[58] Field of Search ......................................... 358/27

[56] References Cited

U.S. PATENT DOCUMENTS

| | | | |
|---|---|---|---|
| 4,250,458 | 2/1981 | Richmond et al. | 329/112 |
| 4,270,177 | 5/1981 | Endoh et al. | 364/571 |
| 4,281,408 | 7/1981 | Bonnerot | 370/70 |
| 4,419,688 | 12/1983 | Miskin et al. | 358/27 |

FOREIGN PATENT DOCUMENTS

| | | |
|---|---|---|
| 0051075 | 10/1980 | European Pat. Off. . |
| 2059202 | 4/1981 | United Kingdom . |
| 2081050A | 2/1982 | United Kingdom . |

OTHER PUBLICATIONS

ITT Intermetall, "A New Dimension–VLSI Digital TV System", Sep. 1981.

*Primary Examiner*—Richard Murray
*Attorney, Agent, or Firm*—E. M. Whitacre; P. J. Rasmussen; C. A. Berard, Jr.

[57] ABSTRACT

An automatic color burst magnitude control (ACC) for a digital television receiver is compatible with and is unaffected by variation of the phase of the color subcarrier signal introduced in demodulating the color subcarrier to effect control of tint. ACC is effectuated by digital gain control for scaling the digital words representing the sampled magnitudes of the color subcarrier burst signal. Quadrature demodulation of the color subcarrier signal produces color signal digital words I and Q which are each sampled and latched during the color subcarrier burst. The averages of the sampled I and Q digital words are applied as respective portions of the address of a read only memory (ROM). The ROM provides error words indicating whether the chroma burst amplitude is too large or too small. A control device responds to the error word to scale the color subcarrier digital words, and therefore scale the chroma burst amplitude to a predetermined magnitude.

15 Claims, 10 Drawing Figures

AUTOMATIC COLOR BURST MAGNITUDE CONTROL FOR A DIGITAL TELEVISION RECEIVER

The present invention relates to automatic color control for a digital television receiver and, in particular, to digital chroma gain control apparatus.

In digital television (TV) receivers, an analog video signal, for example, the baseband video signal, is sampled and the samples converted to representative digital samples by an analog-to-digital (ADC) converter. The digital samples are processed in a digital comb filter to produce digital samples representing separated luminance and chrominance information. The digital luminance and chrominance samples are processed in respective channels of a digital signal processing section which perform functions similar to those performed by analog luminance and chrominance channels found in presently commercially available television receivers. Finally, the digital samples produced by the luminance and chrominance channels of the digital signal processing section are converted into analog signals representing image display information. The conversion is performed by digital-to-analog converters (DAC), the outputs of which are coupled to a kinescope in conventional fashion.

In order that the digital samples generated by the analog-to-digital converter accurately represent the analog baseband video signal, the Nyquist sampling criteria requires that the frequency at which the analog baseband signal is sampled must be at least twice the highest frequency of interest of the analog baseband video signal. Because it is desirable that the sampling signal be consistently related in phase to the analog baseband video signal in order not to introduce distortion in the reproduced image, the sampling signal is derived from the color reference burst signal component of the baseband video signal. The frequency of the color reference burst signal is usually referred to as the color subcarrier frequency $f_{sc}$. Thus, the sampling signal may be derived by an arrangement which extracts the color reference burst component from the baseband video signal and a phase-locked loop (PLL) which locks an oscillator to an integer multiple of the subcarrier frequency $f_{sc}$ of the reference burst signal.

By way of example, in the NTSC system used in the United States, the highest baseband video signal frequency of interest is around 4.2 MHz and the color subcarrier frequency $f_{sc}$ is approximately 3.58 MHz. Accordingly, the lowest sampling signal frequency at an integer multiple of the color burst signal which satisfies the Nyquist criterion is $3f_{sc}$. Because demodulation of color burst signals, as described below, can more readily be realized when the sampling signal is an even multiple of the color subcarrier frequency, the most often proposed sampling frequency is $4f_{sc}$ (approximately 14.32 MHz).

One function performed by the chrominance channel of the digital signal processing section is color demodulation by which the digital chrominance samples occurring at times corresponding to predetermined phase angles of the color reference burst component associated with respective color demodulation color reference vectors are selected and provided at respective outputs. The resultant digital samples can then be used to produce color signals for determining the color content of the reproduced image.

Typically, the color reference vectors chosen for color demodulation correspond either to the 0° and 90° phase points or to the 147° and 237° phase points with respect to the color reference burst signal. The former are commonly referred to as the $-(B-Y)$ and $(R-Y)$ color reference vectors and the latter are commonly referred to as the I and Q color reference vectors. It is more desirable to perform color demodulation with respect to the I and Q color reference vectors, rather than with respect to the $-(B-Y)$ and $(R-Y)$ color reference vectors, because signals corresponding to the I color reference vector have a relatively broad freqency range. In addition, the human eye is more sensitive to such signals because the I signal corresponds to flesh tones.

It is desirable that the chrominance channel of the digital signal processing section be responsive to user controls for adjusting the tint or hue of the reproduced image as desired. In one digital color demodulator including provisions for tint control, color demodulation is accomplished by aligning the phase of the sampling signal so that samples are produced by the A/D converter at times corresponding to the phase angles of the color burst signal associated with the I, Q, $-I$ and $-Q$ color reference vectors. The samples which occur at times corresponding to the I and Q color reference vectors are selectively demodulated and provided at respective I and Q outputs. Tint control is accomplished by adjusting the phase angle of the sampling signal relative to the phase of the color reference burst signal.

Another function performed by the chrominance channel of the digital signal processing section is controlling the amplitude of the digital chrominance signals. Amplitude control is performed automatically to set the amplitude of the color signals in a range suitable for digital processing. One such automatic color control apparatus includes a burst sampler which examines the peak magnitude of digital chrominance channel samples which occur during the color burst interval. The digital chrominance burst samples are compared to a digital reference level to generate a color amplitude control signal. Advantageously, for this purpose, the phase of the sampling signal is aligned so that digital samples corresponding to the peaks of the color burst signal are available in order to obtain the highest possible amplitude for the samples and therefore improve the noise performance of the system. The peaks of the color burst signal occur at 360° multiples of the 0° phase point which corresponds to the $-(B-Y)$ color reference vector.

Unfortunately, the desire to perform color demodulation with respect to the I and Q color reference vectors is not consistent with the desire to produce digital samples corresponding to the $-(B-Y)$ color reference vector for the purpose of chrominance gain control. While $(R-Y)$ and $-(B-Y)$ values can be readily derived from the I and Q color reference vectors, that is not so when the phase of the sampling signal is varied to accomplish tint control.

Thus, there is a need for a digital color television signal processing system including an arrangement for determining the amplitude of the color burst signal for the purpose of chrominance gain control which is not disturbed by the phase of the sampling signal being varied for the purpose of tint control.

In accordance with the present invention, a digital chroma gain control apparatus is provided for a television system wherein the magnitude of a digital chroma reference burst component of sampled digital chroma signals is determined from first and second digital chroma reference signals which are in predetermined phase relationship with respect to each other. Specifically, first and second digital chroma reference signals are produced by sampling the chroma reference burst component of the digital chroma signals and are applied to an addressable memory device as the address thereof. The memory device produces digital words indicative of whether the address corresponds to points separated by the predetermined phase on a sinusoid of predetermined magnitude. A control device responsive to the digital word so produced adjusts the scaling of a processing device to produce digital chroma signals of the predetermined magnitude.

As shown in the FIGURES herein, the broad arrows represent digital data connections for passing digital words having eight bits in parallel, unless a different arrangement is specified.

Figure 1:
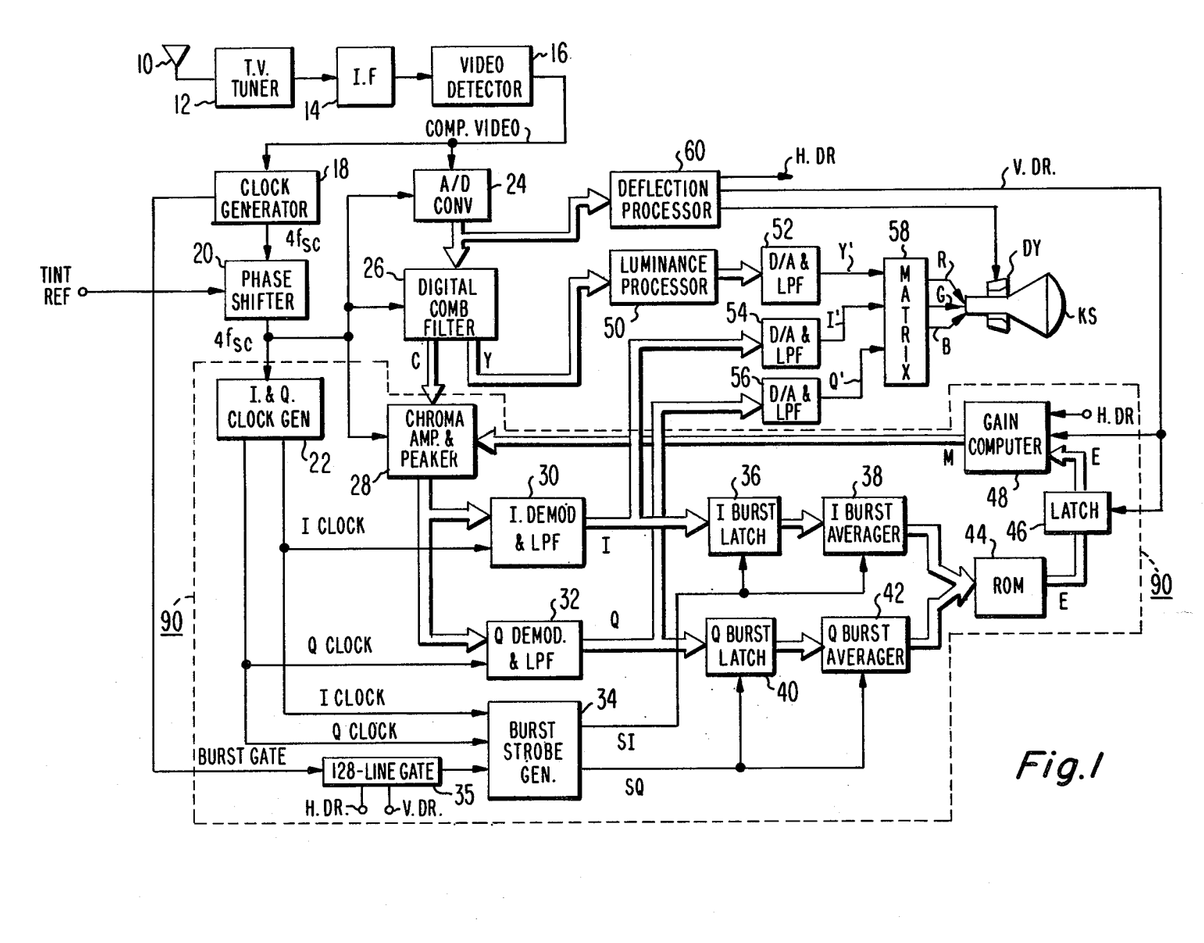
FIG. 1 shows a digital television receiver in block diagram form including an embodiment of the present invention.

In the digital television receiver shown in FIG. 1, conventional television signals are received at antenna 10. A desired channel is selected and the signal corresponding thereto is converted to an intermediate frequency (IF) by television tuner 12. IF signal processor 14 supplies the IF signal to video detector 16 which develops a composite baseband video signal therefrom. Tuner 12, IF processor 14 and video detector 16 can be of conventional implementation as used in presently commercially available television receivers.

Figure 2:
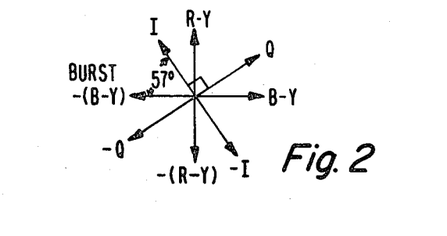
FIG. 2 shows a vector diagram useful in understanding the operation of the digital television receiver shown in FIG. 1.
Figure 3:
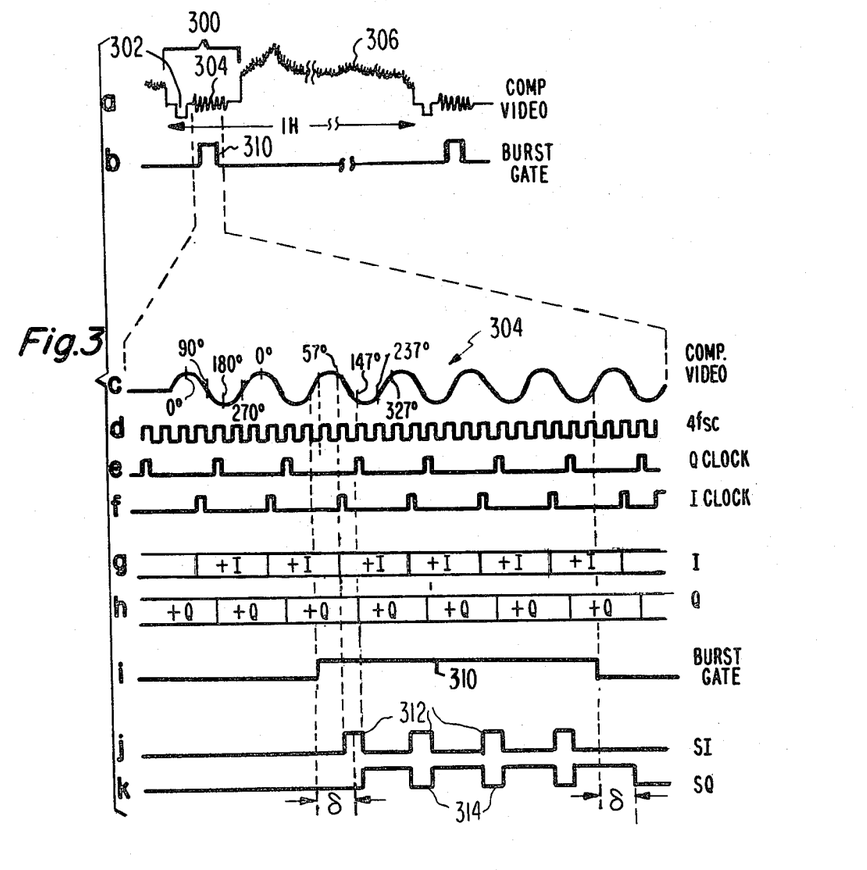
FIGS. 3 and 8 show signal waveforms useful in understanding the operation of the digital television receiver shown in FIG. 1.

Timing signals for digital processing are developed by clock generator 18 in response to the composite video signal, one horizontal line (1H) of which is shown in FIG. 3a. Each horizontal line 1H includes a horizontal blanking interval 300 during which no image information is present. The horizontal blanking interval 300 portion includes horizontal synchronizing pulse 302 followed by a color subcarrier reference burst signal 304 including a minimum of eight cycles of the 3.58 MHz color subcarrier signal. The remaining portion 306 of horizontal line 1H provides image information in accordance with the NTSC standards in which the luminance (brightness) information is related to amplitude and in which the chrominance (color) information is modulated on the 3.58 MHz subcarrier. FIG. 2 shows the relative phases of the chroma reference vectors with the $-(B-Y)$ component being defined at 0° phase with respect to the positive peak of the chroma reference burst signal. The I component is retarded by 57° and is in quadrature with the Q component which is further retarded by 90°, i.e. at 147°. The $-I$ and $-Q$ components are 180° out of phase with the I and Q components, respectively. The $R-Y$, $B-Y$ and $-(R-Y)$ components are at 90°, 180° and 270° phase angles, respectively.

Clock generator 18 provides a burst gate signal shown in FIG. 3b which includes a pulse 310 of duration less than that of the color subcarrier reference burst signal 304 and which is positioned in time, for example, by predetermined delay after horizontal sync pulse 302. A phase-lock loop (PLL) included in clock generator 18 produces a clock signal at $4f_{sc}$ which is synchronized to the color subcarrier reference burst signal during the time interval defined by pulse 310 of the burst gate signal. Synchronism is maintained by the PLL throughout horizontal line 1H.

Phase shifter 20 provides advancement or retardation of the phase of the $4f_{sc}$ clock signal in relation to the phase of color subcarrier burst signal $f_{sc}$ in response to a tint reference signal which is manually adjustable by the user. In net result, the $4f_{sc}$ clock signal at the output of phase shifter 20 is shifted in phase relative to the phase of the color subcarrier reference burst signal $f_{sc}$ by 57° plus or minus the user introduced variation to control tint. In practice, it is unimportant whether the nominal 57° phase shift is provided by clock generator 18 or by phase shifter 20.

The composite video signal from video detector 16 is also applied to analog-to-digital converter 24 which also receives the $4f_{sc}$ clock signal and converts the analog baseband composite video signal to representative eight-bit digital samples at the $4f_{sc}$ sampling frequency. Each digital sample includes a group of eight bits representing the magnitude and polarity of the baseband video signal at the time the sample is taken. The eight-bit samples employed in the arrangement herein described provides satisfactory signal resolution.

The signal waveforms shown in FIGS. 3c through 3k include only a portion of horizontal blanking interval 300 expanded in time scale as indicated by the phantom lines between FIGS. 3b and 3c.

Digital video samples from ADC 24 are coupled to digital comb filter 26 which produces digital samples Y representative of luminance information and digital samples C representative of chrominance information. Digital comb filter 26 includes, for example, a delay element comprising a 910-stage, eight-bit parallel shift register (not shown) to provide a 1H time delay in the NTSC system using the $4f_{sc}$ sampling frequency. The delayed digital samples produced at the output of the 910-stage shift register are combined with undelayed digital samples by an adder (not shown) to produce digital luminance samples (Y) and are combined by a subtractor (not shown) to produce digital chrominance samples (C).

Luminance processor 50 receives digital luminance samples Y and processes them in response to the $4f_{sc}$ sampling signal. The processed luminance digital signals are applied to digital-to-analog converter and low pass filter 52 to develop an analog luminance signal Y'.

Digital chrominance samples C are processed by chrominance processor 90, including chroma amplifier and peaker 28, I demodulator and low pass filter 30, and Q demodulator and low pass filter 32, to develop I and Q digital chroma signals. The operation of chroma processor 90 is described in detail below. The I and Q digital chrominance signals are applied to digital-to-analog converters and low pass filters 54 and 56, respectively, which produce analog chroma signals I' and Q', respectively.

Matrix 58 receives the analog luminance signal Y' and analog chroma signals I' and Q' and develops, in conventional fashion, red R, green G and blue B signals which are applied to kinescope KS. Deflection processor 60 produces horizontal and vertical deflection signals H.DR. and V.DR., respectively, which are applied to kinescope deflection yoke DY in response to the synchronizing information encoded in the digital video samples produced by ADC 24. The raster produced on kinescope KS in response to signals applied to deflection yoke DY cooperates with the R, G, and B signals to produce an image display on KS in conventional fashion.

Digital chrominance processor 90 of FIG. 1 operates in response to the sampling signal $4f_{sc}$ received from phase shifter 20 and the digital chrominance samples C received from comb filter 26. Sampling signal $4f_{sc}$ shown in FIG. 3d is nominally shifted by 57° with respect to the phase of reference burst signal 304 shown in FIG. 3c so as to occur at times corresponding to the I, Q, −I and −Q vectors, as shown in FIG. 2. The timing signals shown in FIGS. 3d, 3e and 3f are present throughout the entire horizontal line 1H thereby producing a series of digital chroma samples I and Q shown in FIGS. 3g and 3h throughout each horizontal line 1H. The values of the I and Q samples will be zero during horizontal blanking interval 300 except during the portion thereof when color reference burst 304 is present. Picture information is not present during blanking interval 300 but is presesnt during the remaining portion 306 of horizontal line 1H.

Figure 4:
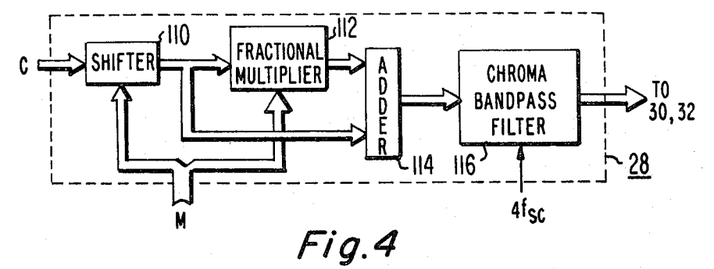
FIGS. 4, 5, 6, 7, 9, and 10 show in block diagram form or in logic diagram form implementations of various portions of the digital television receiver shown in FIG. 1.

Digital chrominance samples C are processed by chroma amplifier and peaker 28, shown in detail in FIG. 4, which provides scaling of the magnitudes of chrominance samples C. Gain multiplier control signal M for chroma amplifier 28 is a nine-bit digital word (the development of which is described below) indicative of the scaling required to develop chroma samples having a predetermined peak-to-peak amplitude, e.g., corresponding to 40 IRE units for the chroma burst reference samples in a TV system in which a one-volt peak-to-peak signal equals 140 IRE units. Two bits of control signal M control eight-bit parallel shift register 110 to shift chroma samples C either one place to the right (i.e. divide by two), or one or two places left (i.e. multiply by two or four, respectively), or to not shift, thereby performing a coarse-gain scaling. The remaining seven bits of control signal M representing a digital fractional value are applied to eight-bit fractional multiplier 112 which also receives the shifted chroma samples from shifter 110.

The product developed by multiplier 112 is combined with the shifted chroma samples by eight-bit adder 114. Multiplier 112 provides a gain factor between zero and 127/128. Thus the ranges of scaling of chroma samples C provided in the output samples from adder 114 is, for example, between $\frac{1}{2}(1+127/128)$ (i.e. between $\frac{1}{2}$ and unity, approximately) when shifter 110 shifts one place right and $4(1+127/128)$ (i.e. between four and eight, approximately) when shifter 110 shifts two places left. A MPY 8HJ-1 fractional multiplier available from TRW LSI Products, La Jolla, Calif. is satisfactory for multiplier 112. Scaled chroma words produced at the output of adder 114 are applied to chroma bandpass filter 116 which may comprise, for example, a digital finite impulse response (FIR) filter. Chroma samples from bandpass filter 116 are coupled to I demodulator 30 and Q demodulator 32 of FIG. 1.

It is understood that one skilled in the art of digital design in constructing embodiments to perform the arithmetic operations described herein, will provide for the sign of the digital signals in accordance with the known principles for operating on, for example, straight binary, ones complement or offset twos complement digital numbers.

I and Q clock generator 22 develops I clock and Q clock signals shown in FIGS. 3e and 3f respectively, in response to sampling signal $4f_{sc}$. The I clock signal is at a high level at times corresponding to the I and −1 phases of the reference burst signal 304 and the Q clock signal is at a high level at times corresponding to the phases of the Q and −Q phases thereof. The I clock and Q clock signals are therefore in quadrature with each other and nominally at 57° and 147°, respectively, relative to the color subcarrier burst signal $f_{sc}$, as is required for demodulation and sampling of the I and Q digital samples.

Figure 5:
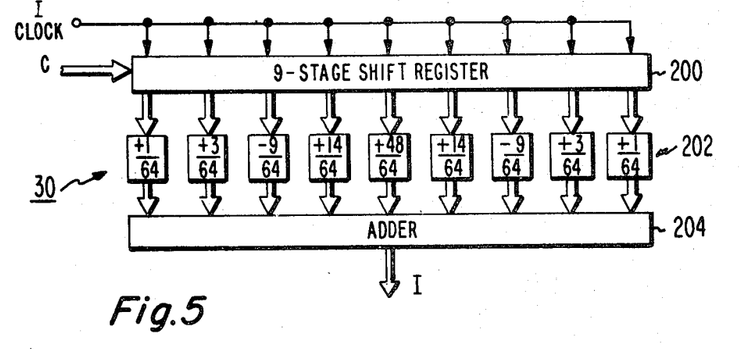

Digital chroma signals from chroma amplifier and peaker 28 are applied to I demodulator and low pass filter 30 shown in FIG. 5. Chroma samples C are applied to a nine-stage, eight-bit parallel shift register 200 and are shifted therethrough in response to the I clock signal shown in FIG. 3f applied to each stage thereof. The digital values of +I samples only are stored in each of the nine stages of shift register 200 and are applied to corresponding ones of the nine weighting devices 202. Each weighting device 202 is a multiplier which multiplies the +I sample digital word applied at its input by the weighting value shown within the blocks in FIG. 5. The respective weighted digital values from weighting devices 202 are summed by a nine-input, eight-bit adder 204 to produce demodulated digital chroma signals I.

Q demodulator and low pass filter 32 is implemented similarly to the I demodulator and low pass filter 30 just described except that its shift register is clocked by the Q clock signal shown in FIG. 3e and its output signal is the demodulated digital chroma signal Q. In addition, because the Q signal is of lesser bandwidth, a shorter shift register and different weighting factors can be employed. Digital chroma signals I and Q, shown in FIGS. 3g and 3h comprise respective series of eight-bit digital words representing the +I sample values, and the +Q sample values. The value of each digital word is unchanged during the time intervals defined between the vertical dividing lines in FIGS. 3g and 3h corresponding in time with the I clock and Q clock signals.

The digital values of the I and Q samples occuring during the reference burst signal 304 are employed for automatically controlling the chrominance processor gain. This sampling interval corresponds to the duration of burst gate pulse 310 which is selected to include a number of the at least eight cycles of the reference burst signal 304, but excluding at least the first and last cycle thereof. This exclusion avoids error which would be introduced because the steady state amplitude of reference burst signal 304 is not present during those cycles.

The values of digital chroma signal I are sampled and stored by I burst latch 36 and are averaged by I burst averager 38 of FIG. 1 during the interval defined by burst gate pulse 310 in response to sample signal SI which includes I sampling pulses 312 shown in FIG. 3j. Similarly, the values of digital chroma signal Q are sampled and stored in Q burst latch 40 and are averaged by Q burst averager 42 of FIG. 1 in response to sample signal SQ which includes Q sampling pulses 314 shown in FIG. 3k. Latches 36 and 40 are eight-bit parallel latches.

Figure 6:
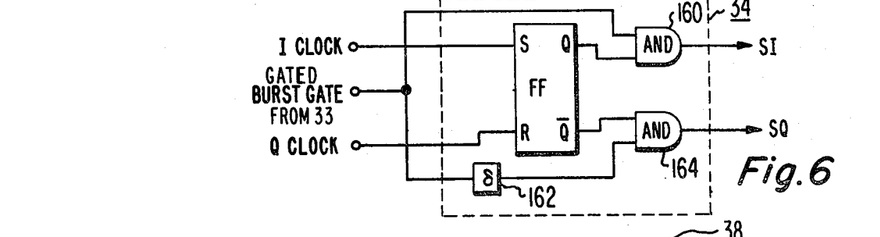
Figure 7:
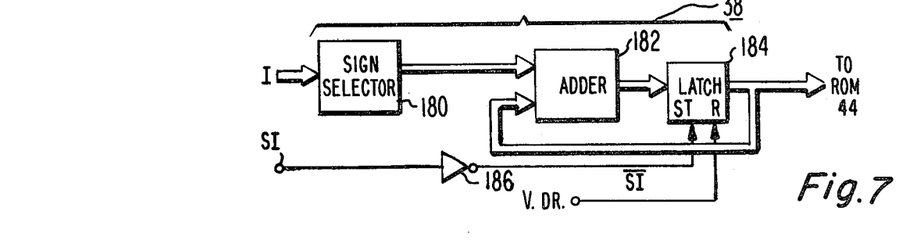

FIGS. 6 and 7 show an arrangement by which a plurality of I reference samples and Q reference samples are taken and an average value for each is determined. This arrangement advantageously reduces the effect of any error introduced by random deviations which might be present in any particular sample of the chroma reference burst signal 304 caused, for example, by noise.

Sampling pulses SI and SQ shown in FIGS. 3j and 3k are developed by the burst strobe generator 34, details of which are shown in FIG. 6. The I clock signal and the Q clock signal are respectively applied to set input S and reset input R of flip flop FF to produce out-of-phase clock signals at the outputs Q and $\overline{Q}$ thereof. The clocking signal developed at output Q of FF is passed by AND gate 160 to become sampling signal SI during the time interval when gated burst gate pulse 310 is applied to the second input of AND gate 160. Similarly, the clocking signal at the $\overline{Q}$ output of FF is passed by AND gate 164 to develop sampling signal SQ during a time interval of equal duration to that of gated burst gate pulse 310. Delay device 162 is interposed to delay application of burst gate pulse 310 to the input of AND gate 164. Delay device 162 is provided so that an equal number of I reference samples and Q reference samples will be obtained, e.g., four samples. Delay interval δ is selected to be of sufficient duration to avoid generation of a sampling pulse in sampling signal SQ during the interval δ immediately following the rising edge of burst gate pulse 310, as shown in FIG. 3k.

Gated burst gate pulses 310 are applied to strobe generator 34 only during the first 128 lines of a picture field. Limiting the number of samples to an integer power of two permits simplification of averagers 38 and 42 described below. To that end, 128-line gate 35 includes a transmission gate (i.e. a switch, not shown) controlled by a line counter (not shown). The line counter is reset by the vertical drive signal V.DR. causing the transmission gate to be closed (i.e. pass gate burst 310). After 128 horizontal drive pulses have been counted, the line counter causes the transmission gate to open thereby removing burst gate pulses from being applied to strobe generator 34.

As thus far described, digital words representing the values of the +I chroma signals corresponding to the reference burst signal 304 during time interval 310 are sequentially stored in I burst latch 36, and digital words representing the values of the +Q chroma signal at that time are sequentially stored in Q burst latch 40.

FIG. 7 shows details of I burst averager 38 which receives a plurality of I chroma reference samples and develop a digital word representative of the average of those samples. Because the +I samples applied may be of either positive or negative sign, it is advantageous to remove the sign associated with those samples to decrease the size of ROM 44 by a factor of two. To this end, I samples, are stripped of their sign by sign selector 180. When +I samples having positive signs are received, sign selector 180 passes the +I samples without change to adder 182 of averager 38. When +I samples having negative signs are received, sign selector 180 changes the sign of that sample and passes it to adder 182. If the +I samples are, for example, offset twos complement numbers, the operations of inversion and addition of one will change the sign of the +I sample causing all I samples to be of like sign in adder 182. Alternatively, sign selector 180 can be arranged to convert all incoming +I samples into positive numbers in straight binary format.

Averaging of the +I samples is provided by the remainder of the structure of averager 38 shown in FIG. 7. Latch 184 initially stores a zero value to which it has been reset by vertical drive signal V.DR. which is applied to its reset input R in response to the vertical synchronizing pulse. A first I chroma reference sample is received by sign selector 180 and is applied to an input of parallel adder 182. Adder 182 produces a digital word equal to the sum of the digital words applied to its inputs from sign selector 180 and latch 184. This sum is thereafter stored in latch 184 in response to inverted sampling signal $\overline{SI}$ provided to its strobe terminal ST by inverter 186. Thereafter, a second I reference sample is passed by selector 180 to be added to the then present sum stored in latch 184 by adder 182. This new sum is then stored by latch 184 in response to SI, replacing the previous contents thereof. This process repeats until the sum of a predetermined number of I reference samples is accumulated and stored in latch 184. In this example, four samples are accumulated during burst interval 304 and stored in latch 184 corresponding to the four pulses in sampling signal SI shown in FIG. 3j.

It is noted that the sign associated with each I reference sample is disregarded so that the accumulated value stored in latch 184 is effectively the sum of the absolute values of the respective I chroma reference samples. This is of no consequence since those samples determine only a portion of the address to ROM 44, as is described below.

Similarly, Q burst averager 42 is implemented by structure identical to that of I burst averager 40 but which receive Q reference samples and sampling signal SQ.

When four samples of an eight-bit word are summed, the sum will include up to ten bits. When this is repeated over 128 lines of a TV field, the sum can include up to seventeen bits. When 512 straight binary samples (i.e. 4×128) are to be averaged, for example, discarding the nine least significant bits from the contents of latch 184 has the same effect as shifting to the right by nine bit positions which is equivalent to dividing by 512. Therefore, the eight-bit word including only the eight most significant bits developed is effectively the average of the 512 I chroma samples. Fewer of the most significant bits may be employed to represent the averaged value where lesser resolution is satisfactory. For full resolution, adder 182 is a seventeen-bit parallel adder and latch 184 is a seventeen-bit parallel latch.

Six bits of the averaged I burst sample word developed by I burst averager 38 and six bits of the averaged Q burst sample word developed by Q burst averager 42 are employed as the six most significant bits and the six least significant bits, respectively, of a twelve-bit address word for 4096×3 bit read only memory ROM 44. Each of the 4096 addressable memory registers of ROM 44 is loaded with a three-bit control word E selected to indicate whether the values of the averaged I and Q samples emoloyed as the address thereof are consistent with a 40 IRE unit chroma burst signal or with one of greater or lesser magnitude.

Figure 8:
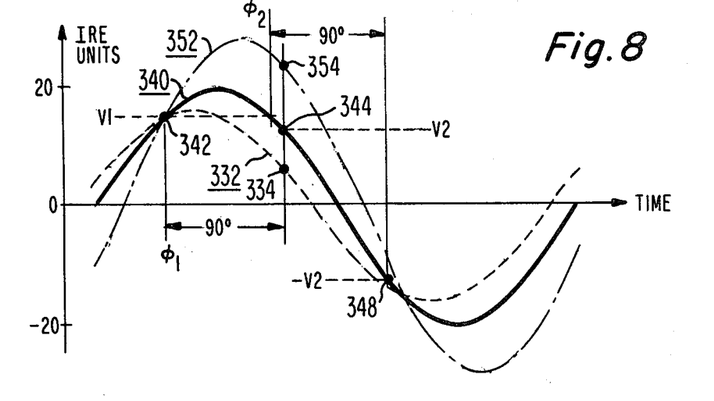

The selection of these codes E is explained in relation to FIG. 8 which shows one cycle each of exemplary chroma burst signal waveforms 332, 340 and 352 having magnitudes of 32, 40 and 52 IRE units, respectively. The waveforms are drawn so that they intersect at an arbitrary phase angle $\phi1$ at which point 342 a sample having a magnitude value V1 is taken.

Chroma burst signal waveform 340 has the desired predetermined magnitude of 40 IRE units and will be used to illustrate that the magnitudes of any two samples thereof taken in predetermined phase relationship (e.g. 90 degrees apart in phase at points 342 and 344) uniquely determine the magnitude of the sinusoid. Chroma signal 340 is mathematically representable as A sin (ωt) wherein A is the peak magnitude (e.g. 20 IRE units). The two sampled magnitudes, e.g., at points 342 and 344, are $$V1 = A \sin \phi, \text{ and}$$

$$V2 = A \sin (\phi + 90°). \qquad [1]$$

Substituting the identity $\sin (\phi + 90°) = \cos \phi$, squaring and adding provides $$V1^2 + V2^2 = A^2 (\sin^2\phi + \cos^2\phi) = A^2. \qquad [2]$$

Solving for V2, the second sample, gives $$V2 = (A^2 - V1^2)^{\frac{1}{2}} \qquad [3]$$

from which it can be observed that the V2 magnitude (whether positive or negative in sign) will be the same for a given magnitude of V1 irrespective of the sign of V1. It is noted that the relationship of the magnitudes is unaffected by the sampling phase angle $\phi$. Thus, the signs of the samples can be ignored so that, in effect, only positive values of V1 need be considered (i.e. the symmetry of waveform 340 around the axis of abscissas makes the positive values redundant of the negative values). For example, if waveform 340 is sampled at phase angle $\phi 2$, the second point 346 at which it has magnitude V1, the second sample taken 90 degrees thereafter at point 348 has the same magnitude V2 but is negatively signed.

Thus, if the chroma burst signal amplitude is 40 IRE units having a first sample magnitude V1, the second sample 90 degrees thereafter will have magnitude V2 if the chroma burst signal amplitude is 40 IRE units. If the chroma burst signal amplitude is too large, as for signal waveform 352, the second sample taken at point 354 will be greater than V2. If the chroma burst signal amplitude is too small, as for signal waveform 332, the second sample taken at point 334 will be smaller than V2.

Registers in ROM 44 store three-bit control words E given in TABLE I indicating the condition of the burst signal magnitude conveyed by the address word formed by the averaged V1 and V2 sample magnitudes developed by I and Q burst averagers 38 and 42.

TABLE I

| Three-Bit Control Word, E (B2, B1, B0) | Amplitude (V2) | Condition |
|---|---|---|
| 111 | $<<(A^2 - V1^2)^{\frac{1}{2}}$ | Amplitude much too small |
| 011 | $<(A^2 - V1^2)^{\frac{1}{2}}$ | Amplitude too small |
| 000 | $=(A^2 - V1^2)^{\frac{1}{2}}$ | Proper Burst Amplitude |
| 010 | $>(A^2 - V1^2)^{\frac{1}{2}}$ | Amplitude too great |
| 110 | $>>(A^2 - V1^2)^{\frac{1}{2}}$ | Amplitude much too great |

Only two types of control words E are necessary for operation according to the present invention–i.e. only one bit B0 indicating the "amplitude too small" and "amplitude too large" conditions so as to increment or decrement the scaling provided by chroma amplifier 28. However, improved operation results from inclusion of a second bit B1 to provide a control word indicating that the burst amplitude has the desired predetermined magnitude. This avoids the condition where the gain (and therefore the burst amplitude) is cyclically increased and decreased between the next higher and next lower levels closest to the desired magnitude. Further improvement results by inclusion of a third bit B2 to indicate when the burst amplitude error is very large so that a more rapid correction of the chroma signal scaling can be performed, as is described below.

To further illustrate the manner in which ROM 44 is addressed and the arrangement of control words E stored therein, TABLE II displays a map of a portion of the memory locations in ROM 44. The I sample average values includes exemplary six-bit values I1, I2, I3, I4 and I5 and the Q sample average values include exemplary six-bit values Q1, Q2, Q3, Q4 and Q5. The address word for ROM 44 comprises the combination of the bits of the I and Q sample average values - e.g. the address word is I1Q1. Thus, if the I address part is 110 011 and the Q address part Q1 is 100 001, the address word is 110 011 100 001.

TABLE II

| I Address Part→ <br> Q Address Part | I1 | I2 | I3 | I4 | I5 |
|---|---|---|---|---|---|
| Q1 | 111 | 111 | 011 | 011 | 000 |
| Q2 | 111 | 011 | 011 | 000 | 010 |
| Q3 | 011 | 011 | 000 | 010 | 010 |
| Q4 | 011 | 000 | 010 | 010 | 110 |
| Q5 | 000 | 010 | 010 | 110 | 110 |

In table II, the combinations of I and Q sample averages which correspond to quadrature points on a sinusoid of the desired amplitude are: I1,Q5; I2,Q4; I3,Q3; I4,Q2; and I5,Q1. Other combinations correspond to too great or too small amplitude conditions.

The control word E stored in the particular register of ROM 44 addressed by I and Q burst averagers 38 and 42 is stored in three-bit latch 46 in response to vertical drive signal V.DR. Thus, the gain control is adjusted at the vertical rate of the TV receiver, e.g. 60 times per second in the NTSC system. Latch 46 prevents possibly erroneous control words E developed during the time in which the I and Q burst averages are being developed from affecting the chroma gain.

Figure 9:
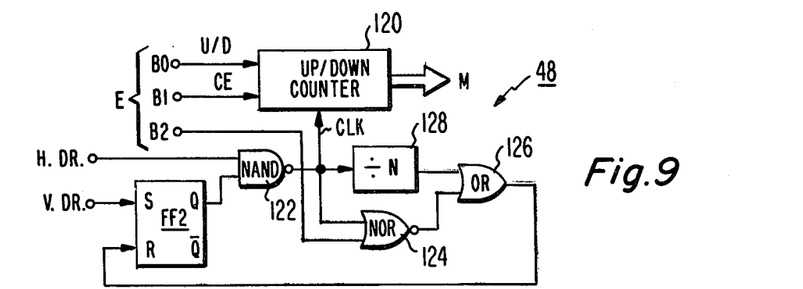

Gain computer 48, shown in FIG. 9, receives the control word E stored by latch 46 and develops gain multiplier control word M therefrom. Nine-bit up/-down counter 120 develops the nine-bit control word M at the outputs of its nine stages. Counter 120 is enabled to increment (count up) when bit B0 applied to its up/-down control input U/D is a logical "1" and to decrement (count down) when bit B0 is a logical "0". Counter 120 increments or decrements in response to clock signal CLK if bit B1 applied to its clock enable input CE is a logical "1".

The count stored in counter 120 is incremented or decremented once for each cycle of clock signal CLK. When control word E indicates that the chroma amplitude is too small or too large, i.e. B2 is a "0", a single clock pulse is applied to counter 120. Flip-flop FF2 is set by the beginning of vertical drive signal V.DR. applied to its set input S. That causes the Q output of FF2 to apply a "1" to an input of NAND gate 122 which conditions NAND gate 122 to pass the horizontal drive signal H.DR. as clock signal CLK to counter 120.

NOR gate 124 receives a "0" from bit B2 and a "1" from NAND gate 122 to produce a "0" output. When H.DR. goes high, CLK becomes a "0" causing NOR gate 124 to develop a "1" which is passed by OR gate 126 to reset input R of FF2 thereby resetting its Q output to "0" and preventing NAND gate 122 from developing further clock signals CLK until the next V.DR. pulse is received. This arrangement provides slow incrementation and decrementation of the gain muliplier M at the rate of one count per TV field.

When the chroma burst signal amplitude departs substantially from the desired 40 IRE level, it is desirable to correct the level by changing the gain of chroma amplifier 28 at a faster rate. To this end, divide-by-N counter 128 in FIG. 9 causes N clock pulses CLK to be applied to counter 120 for each TV field in which the chroma burst amplitude is much too small or much too large, i.e. when bit B2 of control word E is a "1". NOR gate 124 is disabled from developing an output which would reset FF2 because B2 forces one input of NOR gate 124 high. After N clock pulses CLK, for example, four pulses, are developed, counter 128 develops a "1" output which is passed by OR gate 126 to reset input R of FF2. FF2 becoming reset prevents NAND gate 122 from passing further cycles of horizontal drive signal H.DR. as clock signals CLK until after the next V.DR. pulse is received. This arrangement provides rapid incrementation and decrementation of the gain multiplier M at the rate of N counts (e.g., four counts) per TV field.

The foregoing automatic chroma control arrangement is particularly advantageous in a digital television receiver in which tint control is obtained by adjusting the phase of the sampling clock $4f_{sc}$ relative to the phase of the color subcarrier signal 304. It is noted that the digital control signal value E produced by ROM 44 and latch 46 is responsive to the amplitude of the chroma reference burst signal 304 and is unaffected by the particular phase angle $\phi$ at which chroma reference burst signal 304 is sampled. Therefore, tint control accomplished by adjusting the phase angle of the sampling signal $4f_{sc}$ relative to the phase of the color burst reference signal 304 will not disturb operation of the automatic chroma control arrangement of the present invention.

Figure 10:
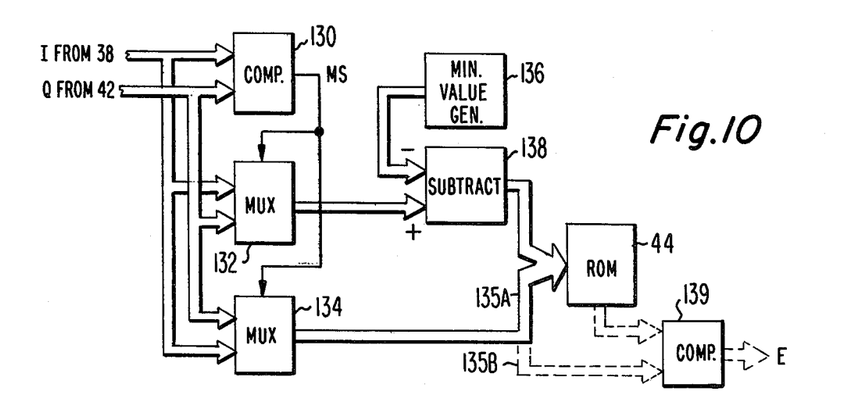

FIG. 10 shows apparatus interposable between I burst averager 38, Q burst averager 42 and ROM 44 to permit substantial reduction in the number of memory registers required in ROM 44. Digital comparator 130 compares the I average value and the Q average value to develop a multiplexing signal MS. MS is applied to multiplexer 132 to cause it to select the larger one of the I and Q average values and to multiplexer 134 to cause it to select the smaller one thereof.

It is noted that there must be a minimum value such that the burst amplitude cannot be sufficient when the larger of the I and Q samples is less than the minimum value. Generator 136 provides a digital word representative of that minimum value. Subtractor 138 reduces the greater of the I and Q average values by the minimum value provided by generator 136 and applies the result thereof to ROM 44 as a portion of an address word. When the output from subtractor 138 would become negative indicating that the burst amplitude is too small without having to consider the value provided by MUX 134, ROM 44 provides the control word E indicating that the amplitude is too small. This is conveniently accomplished by limiting the output of subtractor 138 to zero. The remainder of the address word is provided by the smaller of the I and Q average values selected by MUX 134.

Ordering the larger and smaller of the I and Q average values within the address word for ROM 44 permits reduction of the address word by tw bits, and subtracting the minimum valued word permits further reduction by one bit, without loss of accuracy. Thus, five-bit devices are satisfactory for comparator 130, MUXs 132 and 134, and subtractor 138. Subtractor 138 provides four bits and MUX 134 provides five bits of the nine-bit address word for ROM 44 which need have only 512 three-bit memory registers.

Modifications to the above described embodiments are contemplated to be within the scope of the present invention which is limited only by the claims following. For example, the arrangement of FIG. 10 can be modified to further reduce the size of ROM 44. In this modification ROM 44 includes 32 addressable registers each storing a five-bit word which is the proper value of the lesser of the I and Q samples corresponding to the five-bit greater one of the I and Q samples from MUX 132 which is employed to address ROM 44. Signals from MUX 134 are applied to comparator 139 via phantom broad arrow 135B rather than to ROM 44 via broad arrow 135A. The five-bit word provided by ROM 44 (phantom broad arrow) is then compared to the lesser of the I and Q samples selected by MUX 134 (phantom broad arrow 135B) by a five-bit digital comparator 139 which develops the control signal E described above.

By way of further example, I and Q burst averagers 38 and 42 could average lesser or greater numbers of samples than the four per line for 128 lines per field described herein. When demodulators 30 and 32 demodulate both +I and −I samples, and +Q and −Q samples, respectively, eight values of each of the I burst and Q burst signal can be averaged for each horizontal line 1H. In addition, the present invention is operative even if only one I burst sample and one Q burst sample were to be used to develop the address word for ROM 44. It is noted, however, that disturbances caused by random effects such as noise are less pronounced when the arrangement of FIG. 1 including I and Q averagers 38 and 42 is employed.

While the foregoing description includes an eight-bit quantization of digital video signals, the present invention may be employed with digital signals of greater or lesser quantization. In an embodiment in which the degree of phase variation for tint control purposes can exceed ±33° so that either of the +I or +Q samples could reverse sign, sign selector 180 shown in FIG. 5 is preferably interposed between latch 184 and the address input of ROM 44 rather than preceeding adder 182.

What is claimed is:

1. In a television receiver including a source of digital chroma signals having a chroma reference burst component, a digital chroma gain control apparatus comprising:

processing means responsive to a digital chroma control signal for scaling the magnitude of said digital chroma signals;

sampling means responsive to the chroma reference burst component of said digital chroma signals for producing first and second digital chroma reference signals, said second digital chroma reference signal being produced in predetermined phase relationship to said first digital chroma reference signal;

memory means having a plurality of addressable registers for storing digital words therein, the digital word stored in each addressable register being indicative of whether first and second portions of the address of said register correspond to values at points in said predetermined phase relationship on a sinusoid of predetermined magnitude;

means for applying said first and second digital chroma reference signals to said memory means as the first and second portions of the address of said addressable registers thereof to cause said memory means to provide the digital word stored in said addressed register;

control means developing said chroma control signal in response to the addressed stored digital word provided by said memory means for controlling the scaling of said processing means.

2. The apparatus of claim 1 wherein said sampling means comprises:

averaging means receiving said first and second digital chroma reference signals for producing first and second averaged digital chroma reference signals representative of at least the sum of a plurality of samples of said first and second digital chroma reference signals, wherein said first and second averaged digital signals are applied to said memory means as said first and second portions, respectively, of the address of said addressable registers thereof.

3. The apparatus of claim 1 wherein said sampling means comprises:

latch means for storing said first and second digital chroma reference signals in response to a strobing signal;

clocking means for developing a clock signal in said predetermined phase relation with respect to the chroma reference burst component of said digital chroma signals; and strobing means for developing said strobing signal in response to said clock signal at times when the chroma reference burst component of said digital chroma signals is present.

4. The apparatus of claim 3 wherein said clocking means develops said clock signal including first and second clock signal components in phase quadrature with respect to the phase of said chroma reference burst component, and wherein said strobing means develops said strobing signal including respective first and second strobing components in response to said first and second clock signal components, respectively.

5. The apparatus of claim 1 wherein said means for applying comprises:

comparing means for determining the larger one of said first and second digital chroma reference signals;

first signal selecting means responsive to said comparing means for applying the larger one of said first and second digital chroma reference signals to said memory means as the first portion of the address thereof; and second signal selecting means responsive to said comparing means for applying the smaller one of said first and second digital chroma reference signals to said memory means as the second portion of the address thereof.

6. The apparatus of claim 5 including a source of a minimum value digital signal, and means interposed between said first signal selecting means and said memory means for subtracting said minimum value digital signal from the larger one of said first and second digital chroma reference signals selected by said first signal selecting means.

7. The apparatus of claim 1 wherein the digital words stored in said memory means indicate whether the first and second portions of said address correspond to values at said predetermined phase relationship points on a sinusoid of greater, lesser or substantially equal magnitude to said predetermined magnitude.

8. The apparatus of claim 7 wherein the digital words stored in said memory means further indicate whether the first and second portions of said address correspond to values at said predetermined phase relationship points on a sinusoid of magnitude greater or lesser than said predetermined magnitude by more than a predetermined value.

9. The apparatus of claim 1 wherein said control means comprises:

a source of clocking signals;

an up-down counter for providing the count stored therein as said chroma control signal; and counting control means for applying the stored digital word provided by said memory means and said clocking signals to increment and decrement said up-down counter.

10. In the apparatus of claim 9 wherein said processing means includes digital shifting means for shifting said digital chroma signals and multiplying means for multiplying said digital chroma signals by a factor, said control means including means applying the most significant bits of said chroma control signal to control said digital shifting means and the lesser significant bits thereof to said multiplying means as said factor.

11. The apparatus of claim 9 wherein said stored digital word further indicates when said first and second digital chroma reference signals depart from said predetermined magnitude sinusoid by more than a predetermined amount, and said counting control means applies a first number of said clocking signals when said stored digital word indicates said departure is less than said predetermined amount and applies a second greater number of said clocking signals when said stored digital word indicates said departure exceeds said predetermined amount.

12. The apparatus of claim 1 wherein said predetermined phase relationship includes signals and points in quadrature with respect to the phase of the chroma reference burst component of said chroma signals.

13. In a television receiver including a source of digital chroma signals having a chroma reference burst component, a digital chroma gain control apparatus comprising:

processing means responsive to a digital chroma control signal for scaling the magnitude of said digital chroma signals;

sampling means responsive to the chroma reference burst component of said digital chroma signals for producing first and second digital chroma reference signals, said second digital chroma reference signal being produced in predetermined phase relationship to said first digital chroma reference signal;

memory means having a plurality of addressable registers for storing digital words therein, the digital word stored in each addressable register being indicative of whether the address of said register corresponds to points in said predetermined phase relationship on a sinusoid of predetermined magnitude;

means for applying at least one of said first and second digital chroma reference signals to said memory means as the address of said addressable registers thereof to cause said memory means to provide the digital word stored in said addressed register;

control means developing said chroma control signal in response to at least the addressed stored digital word provided by said memory means for controlling the scaling of said processing means.

14. In the apparatus of claim 13 wherein each digital word stored in the addressable registers of said memory means corresponds to the value of the quadrature point corresponding to a point having the value of the address of that said register, and wherein said first digital chroma reference signal is applied as the address of the addressable registers of said memory means, said control means including means responsive to said addressed stored digital word and to said second digital chroma reference signal for developing said chroma control signal.

15. In the apparatus of claim 13 wherein said first and second digital chroma reference signals are applied as first and second portions of the address of the addressable registers of said memory means, and wherein each digital word stored in the addressable registers of said memory means indicates whether the first and second portions of the address of said register correspond to values at quadrature points on said sinusoid of predetermined magnitude, said control means including means responsive to said addressed stored digital word for developing said chroma control signal.

* * * * *